(12) United States Patent
Miyamura et al.

(10) Patent No.: US 10,497,391 B1
(45) Date of Patent: Dec. 3, 2019

(54) REWINDING A TAPE MEDIUM

(71) Applicant: International Business Machines Corporation, Armonk, NY (US)

(72) Inventors: Tsuyoshi Miyamura, Yokohama (JP); Setsuko Masuda, Toshima (JP); Eiji Ogura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/109,818

(22) Filed: Aug. 23, 2018

(51) Int. Cl.
| | |
|---|---|
| G11B 5/09 | (2006.01) |
| G11B 15/44 | (2006.01) |
| G11B 5/008 | (2006.01) |
| G11B 15/18 | (2006.01) |
| G11B 15/24 | (2006.01) |
| G11B 15/43 | (2006.01) |

(52) U.S. Cl.
 CPC ........ *G11B 15/448* (2013.01); *G11B 5/00817* (2013.01); *G11B 15/1883* (2013.01); *G11B 15/24* (2013.01); *G11B 15/43* (2013.01)

(58) Field of Classification Search
 None
 See application file for complete search history.

(56) References Cited

U.S. PATENT DOCUMENTS

| | | | | |
|---|---|---|---|---|
| 3,931,513 A * | 1/1976 | Germain | ................ | G11B 15/08 250/205 |
| 4,398,227 A * | 8/1983 | Anderson | ................ | G11B 5/09 242/334.3 |
| 5,032,211 A * | 7/1991 | Shinno | ................ | B29C 70/386 156/361 |
| 5,287,478 A * | 2/1994 | Johnston | ................ | G06F 3/0601 360/48 |
| 5,388,016 A * | 2/1995 | Kanai | ................ | G06F 3/0601 360/72.1 |
| 5,434,735 A * | 7/1995 | Masuda | ................ | G11B 15/64 360/130.24 |
| 5,625,507 A * | 4/1997 | Ota | ................ | G11B 15/00 360/71 |
| 6,425,042 B1 * | 7/2002 | Ikeda | ................ | G06F 3/0605 360/69 |
| 2002/0006008 A1 * | 1/2002 | Deguchi | ................ | G11B 15/48 360/74.1 |
| 2005/0248869 A1 * | 11/2005 | Bartlett | ................ | G11B 15/05 360/31 |
| 2006/0047905 A1 * | 3/2006 | Matze | ................ | G06F 3/0605 711/114 |
| 2013/0016439 A1 * | 1/2013 | Argumedo | ................ | G11B 15/32 360/73.07 |
| 2014/0327985 A1 | 11/2014 | Bui et al. | | |
| 2014/0344516 A1 | 11/2014 | Sims et al. | | |
| 2017/0249100 A1 | 8/2017 | Kawamura et al. | | |

* cited by examiner

*Primary Examiner* — Peter Vincent Agustin
(74) *Attorney, Agent, or Firm* — James L. Olsen

(57) ABSTRACT

Aspects of the present disclosure relate to rewinding a tape medium. Data is written to the tape medium under a first tension. An end data region of the tape medium is identified, where the end data region is not the end of the tape medium. An indication that the tape medium is to be unmounted is received. The position of the tape medium is moved to the end data region. The tape medium is then rewound from the end data region under a second tension, the second tension being lower than the first tension.

11 Claims, 10 Drawing Sheets

REWINDING A TAPE MEDIUM

BACKGROUND

The present disclosure relates to data storage, and more specifically, to rewinding a tape in a tape drive.

Tape media are widely used as a removable, sequentially accessible, and cost-effective storage media of data. Tape media can be used for long-term storage purpose. Additionally, tape media may be used as secondary storage in a hierarchy storage management (HSM) system. A tape drive (e.g., a Linear Tape Open (LTO) tape drive) writes data to a tape medium (hereinafter referred to as "tape") sequentially along the length of the tape. Before reading and/or writing data on a tape, the tape drive loads and mounts the tape. Once reading and/or writing of data are completed, the tape may be unmounted and unloaded as needed to make the tape drive available for other tape cartridges.

SUMMARY

Embodiments of the present disclosure include a method, system, and computer program product for rewinding a tape medium. Data can be written to the tape medium under a first tension. An end data region of the tape medium can be identified, where the end data region is not the end of the tape medium. An indication that the tape medium is to be unmounted can be received. The position of the tape medium can be moved to the end data region. The tape medium can then be rewound from the end data region under a second tension, the second tension being lower than the first tension.

The above summary is not intended to describe each illustrated embodiment or every implementation of the present disclosure.

Figure 1:
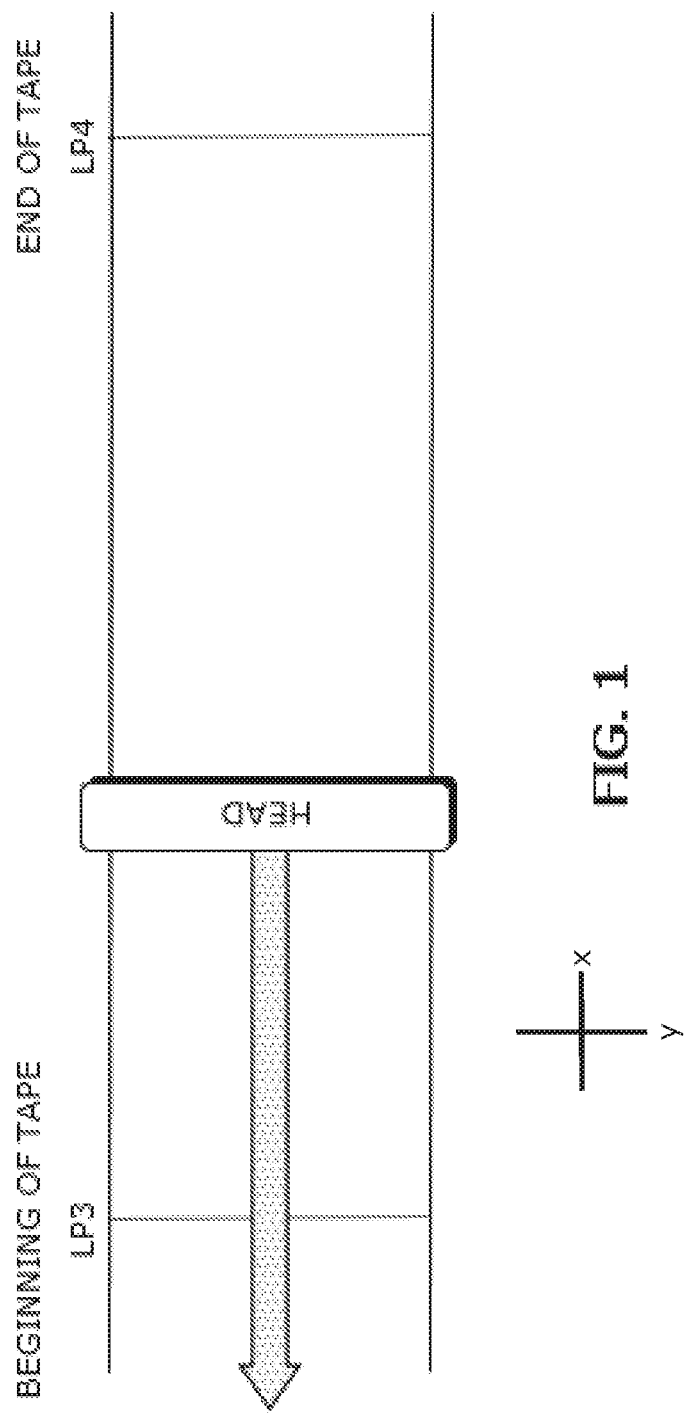
FIG. 1 illustrates a diagram for rewinding a tape, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Tape media are widely used as a removable, sequentially accessible, and cost-effective data storage media. A tape drive writes data to a tape sequentially along the length of the tape. Once reading and/or writing of data are completed, the tape may be unmounted and unloaded to make the tape drive available for other tape cartridges as needed.

When reading and/or writing data on a tape, the tape drive pulls the tape with a particular level of tension such that a drive head contacts the surface of the tape uniformly. If the tape is rewound to the cartridge with the same level of tension as with reading/writing data before unloading the tape, the tape may be widened by the pressure applied from the upper direction. If the tape is widened, the tape drive may fail to properly read data written on the tape as the track pitches may change while the distance between data reader cells on the tape drive head may remain constant.

IBM TS1150/TS1155 Tape Drives and eighth-generation LTO (LTO-8) tape drives provide features to lower the tension applied to the tape surface while the tape is rewound. However, these features increase the time required for rewinding due to the slower rewinding speed. With respect to some tape cartridge products, a length of the tape is approximately 1,000 meters while the rewinding speed is around 7.6 meters/sec. In such cases, it takes several minutes (1000 m×2/7.6 m/s=263 s or 4 min 23 s) to unload the tape if the position of the tape is near the beginning of the tape (BOT) when the unloading instruction is issued.

FIG. 1 illustrates a technique for rewinding a tape in a tape drive, in accordance with embodiments of the present disclosure. In this technique, upon receiving a request for unloading a tape in a tape drive after reading and/or writing are completed, the tape drive rewinds the tape to the beginning of tape (BOT) by exerting a first tension on the tape when the reading and/or writing end. As discussed herein, LP3 and LP4 indicate the beginning of tape (BOT) and end of tape (EOT) respectively, between which the tape drive can read and write data.

If the tape is rewound to the cartridge with the substantially same level of tension as one for reading/writing data before unloading the tape, that tape may be widened by the pressure applied from the upper direction. If the tape is widened (in width direction, or along the y-axis,), the tape drive may fail to properly read data on the tape since the track pitches may be changed while the distance between data reader cells on the tape drive head may be constant.

Figure 2:
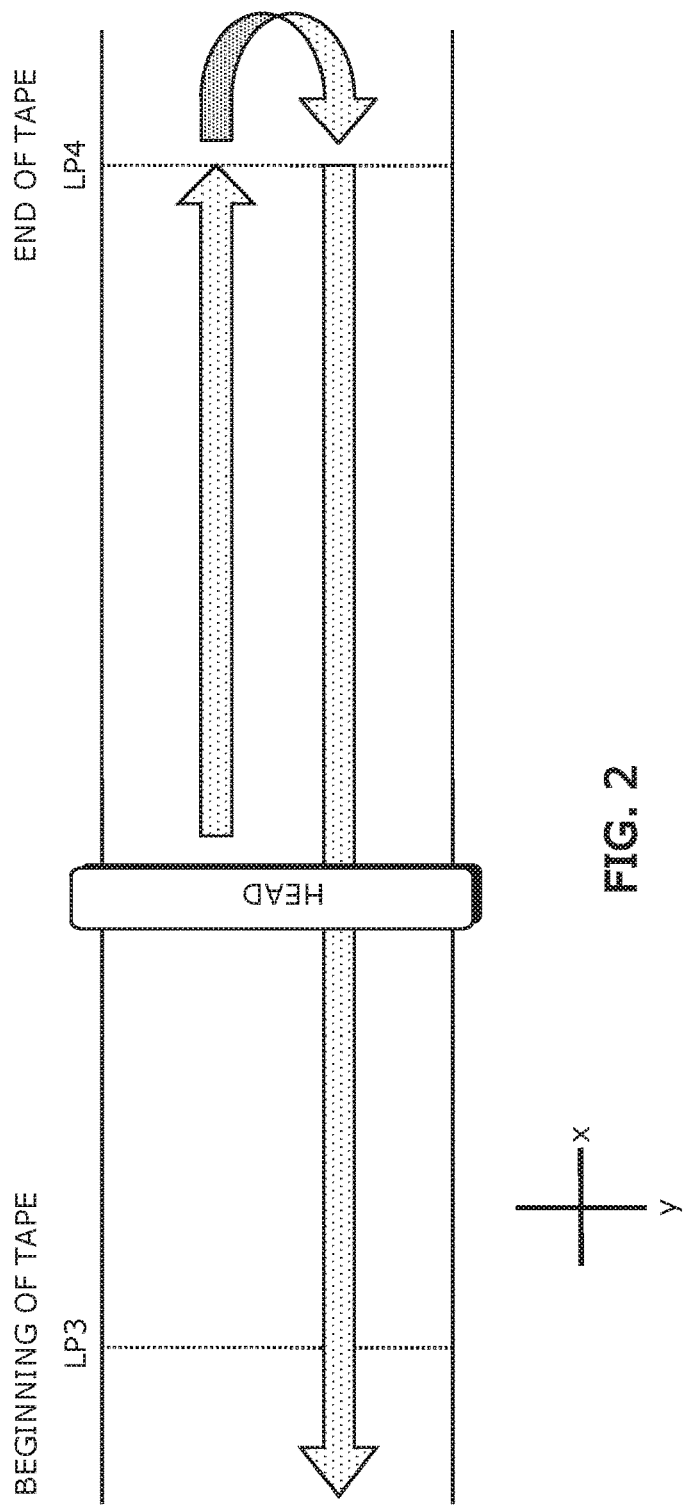
FIG. 2 illustrates another diagram for rewinding a tape in a tape drive in accordance with embodiments of the present disclosure.

FIG. 2 illustrates another technique for rewinding a tape in a tape drive, in accordance with embodiments of the present disclosure. The tape drive has a function to move the running position of the tape to the EOT (e.g., LP4), and then rewind the tape with low tension from the EOT to the BOT. In this example, it takes a longer time to rewind the tape than the technique depicted in FIG. 1, since the tape drive requires time to move the running position of the tape to the EOT and rewind the tape for all regions of the tape from the EOT to the BOT. Further, the reeling speed (e.g., rewind speed) of the tape with lower tension may be slower.

In embodiments of the present disclosure, a tape drive divides a tape into a plurality of regions (e.g., the dividing lines disposed along the y-axis) and writes data to the regions sequentially. Upon completion of processing read requests and/or write requests, a host computer or the tape drive determines whether the tape is to be unloaded.

If a determination is made that the tape is to be unloaded upon a request, the tape drive moves the running position of the tape from a current position to the EOT, and then rewinds the tape from the EOT with low tension.

In embodiments of the present disclosure, less time is required for unloading the tape for long-term storage (e.g., storing the tape in a library of tapes to be read at a later time) than those of the conventional techniques since only region(s) which were already used for data storage are rewound in the longitudinal direction with the lower tension.

Figure 3:
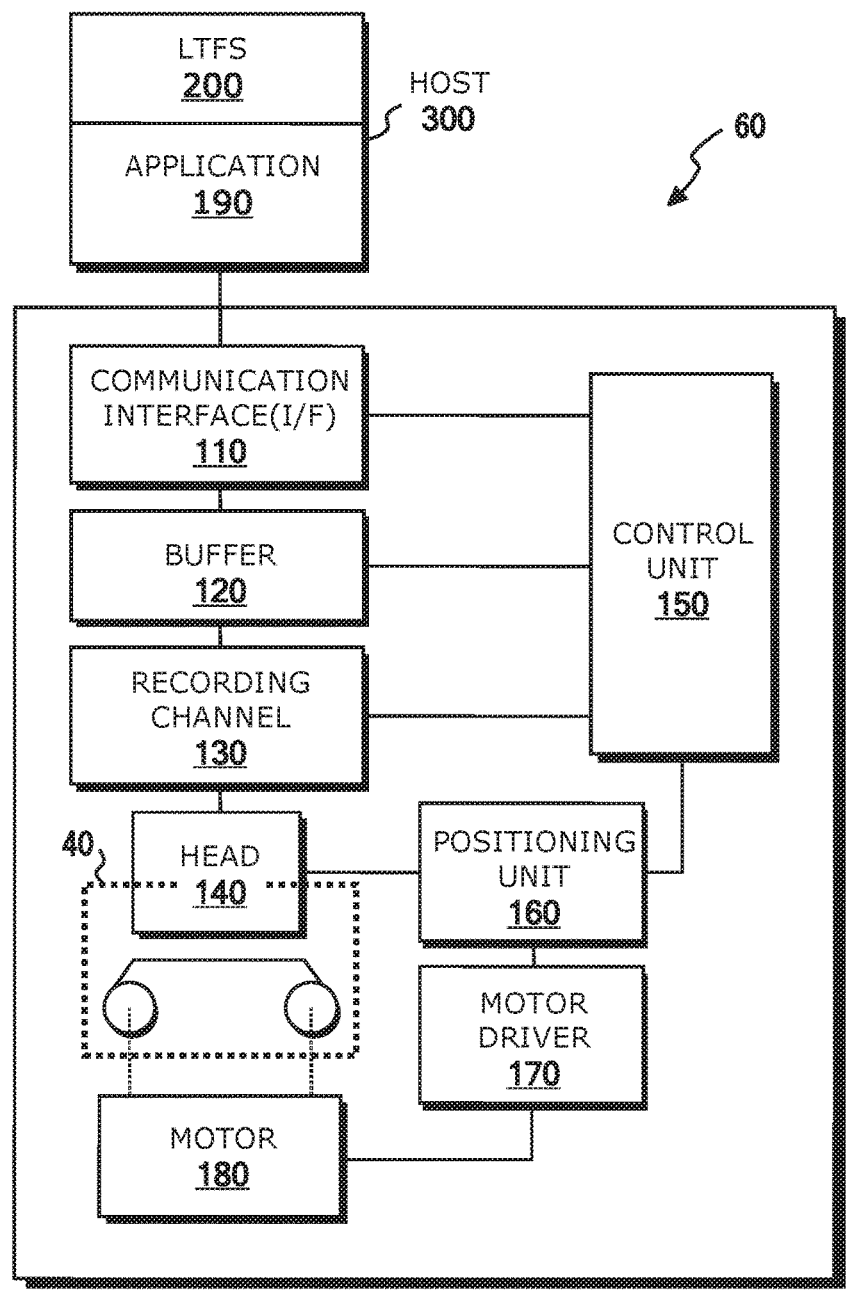
FIG. 3 illustrates an example system including a tape drive, in accordance with embodiments of the present disclosure.

FIG. 3 illustrates a block diagram of an example hardware configuration for a storage system including a tape drive 60 coupled to a host computer 300, in accordance with embodiments of the present disclosure. The tape drive 60 receives one or more read/write requests from an application 190 located in a Linear Tape File System (LTFS) 200 of a host computer 300. The LTFS 200 is a file system that can read/write data on a tape using a certain file format (e.g., similar to flash storage or hard disk drives). The LTFS 200 can use the same tape drive file system as an eighth-generation Linear Tape Open (LTO-8) tape drive and IBM Tape Drive products such as TS1150/TS1155.

The tape drive 60 includes a communication interface (I/F) 110, a buffer 120, a recording channel 130, a read/write head 140, a control unit 150, a positioning unit 160, a motor driver 170, and a motor 180.

The interface 110 communicates with a host computer 300 (e.g., a host, a host device, etc.) via a network. For example, the interface 110 receives from the host computer 300 write commands instructing the device to write data to a tape 40 (e.g., a tape medium, a tape cartridge, etc.). The interface 110 also receives from the host device 300 read commands instructing the device to read data from the tape 40. The interface 110 has a function for compressing write data and decompressing compressed read data. This function increases the actual storage capacity of the tape 40.

The tape drive 60 reads and writes to the tape 40 in data sets (hereinafter referred to as "DS") composed of a plurality of records sent from the application 190 in the host computer 300. Data sets can be any suitable size (e.g., 4.0 MB). The host computer 300 specifies files in the file system or records in small computer system interface (SCSI) commands when sending write/read requests to the tape drive. DS are composed of a plurality of records.

Each DS can include management information related to the data set. User data is managed in record units. Management information can be included in a data set information table (DSIT). A DSIT can include the number of records and file marks (FMs) in the DS, and the cumulative number of records and FMs that have been written from the BOT.

The buffer 120 is memory used to temporarily store data to be written to the tape 40 or data to be read from the medium. For example, the buffer 120 may be dynamic random-access memory (DRAM). A recording channel 130 is a communication pathway used to write data stored in the buffer 120 to the tape 40 or to temporarily store data read from the tape 40 in the buffer 120.

The read/write head 140 has a data read/write element for writing data to the tape 40 and reading data from the tape 40.

In embodiments, the head 140 has a servo read element for reading signals from the servo tracks provided on the tape 40. The positioning unit 160 directs the movement of the read/write head 140 with respect to the medium 40. The motor driver 170 drives the motor 180.

The tape drive 60 writes data to a tape 40 and reads data from a tape 40 in accordance with commands received from the host computer 300. The tape drive 60 includes a buffer, a read/write channel, a head, a motor, tape-winding reels, read/write controls, a head alignment control system, and a motor driver. A tape cartridge is detachably loaded in the tape drive. The tape moves longitudinally (e.g., along the length) as the reels rotate. The head writes data to the tape and reads data from the tape as the tape moves longitudinally.

The tape 40 includes non-contact/non-volatile memory called cartridge memory (CM). The tape drive 60 reads and writes to the CM installed in the tape 40 in a non-contact manner. The CM stores cartridge attributes. During reading and writing, the tape drive retrieves cartridge attributes from the CM to perform the read/write operation properly.

The control unit 150 manages operations within the tape drive 60. In other words, the control unit 150 controls the writing of data to the tape 40 and the reading of data from the tape 40 in accordance with commands received via the interface 110. The control unit 150 also controls the positioning unit 160 in accordance with retrieved servo track signals.

In addition, the control unit 150 controls the operation of the motor 180 via the positioning unit 160 and the motor driver 170. The motor driver 170 may be connected directly to the control unit 150. In embodiments, using the motor 180 (controlled by the motor driver 170, the positioning unit 160, and the control unit 150), the tape drive 60 can rewind the tape with two different tensions (normal tension and low tension). The normal tension can be the substantially same level of tension as one for reading from and writing to the tape 40. The low tension can be a lower than normal tension, which is used before unloading for long-term storage of data.

It is noted that FIG. 3 is intended to depict the representative major components of an exemplary storage system. In some embodiments, however, individual components may have greater or lesser complexity than as represented in FIG. 3, components other than or in addition to those shown in FIG. 3 may be present, and the number, type, and configuration of such components may vary.

Figure 4:
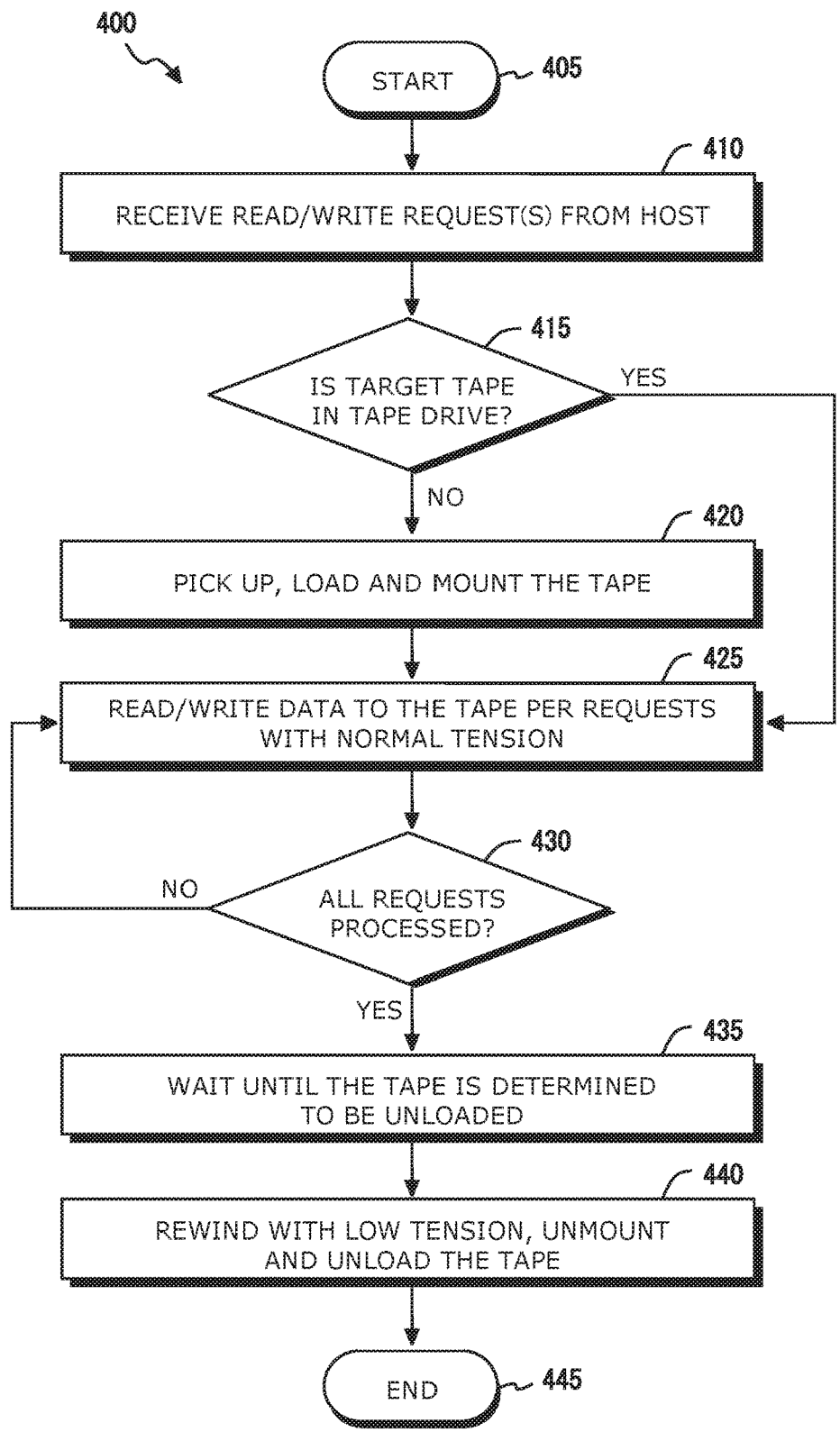
FIG. 4 illustrates a flow diagram for reading, writing, and unloading a tape medium in a storage system, in accordance with embodiments of the present disclosure.

FIG. 4 illustrates a flowchart of an example process 400 for reading and/or writing data to a tape, in accordance with embodiments of the present disclosure. As shown in FIG. 4 after the process 400 initiates at operation 405, the tape drive 60 (e.g., connected to the host computer 300 via a network), receives one or more read/write requests (e.g., from the application 190 running on the host computer 300 through a file system). This is illustrated at operation 410. In embodiments, this file system may be the Linear Tape File System (LTFS) 200 that allows data files on tape to be accessed as if they are stored on HDDs (hard disk drives) or removable flash drives.

The tape drive 60 then identifies a tape to which data is to be written or in which data to be read is stored (hereinafter referred to as "target tape") based on the received read/write requests and determines whether the target tape has been already loaded into the tape drive 60. This is illustrated at operation 415. If a determination is made that the target tape has not been loaded into the tape drive 60 (e.g., "NO" at operation 415), the target tape is selected (e.g., retrieved, picked up, acquired, etc.) from tape cartridge storage and carried (e.g., transported) to the tape drive 60 (e.g., automatically by a robotic arm (not shown in FIG. 3) or manually by a user) and then loaded and mounted in the tape drive 60. This is illustrated at operation 420. Once the target tape is loaded into the tape drive 60 (at operation 420), or if a determination is made that the target tape is already loaded in the tape drive 60 (e.g., "YES" at operation 415), then process 400 proceeds to operation 425.

At operation 425, the tape drive 60 reads data from and/or writes data to the target tape according to the read/write requests (e.g., received from the host computer 300). Normal tension may be used for reads and/or writes at operation 425.

Process 400 then proceeds to operation 430 when the tape drive 60 determines whether all read/write requests received from the host computer at (e.g., at operation 410) have been processed. If all read/write requests have not been processed (e.g., "NO" at operation 430), then the process 400 returns to operation 425 and iterates until all read/write requests received have been processed. If a determination is made that all read/write requests have been processed (e.g., "YES" at operation 430), then the tape drive 60 waits until a determination is made that the target tape is to be unloaded. This is illustrated at operation 435. This determination may be performed based on one or more factors including but not limited to: whether another tape cartridge needs to be loaded to the tape drive 60 and/or whether the tape drive 60 has received no new read/write requests within a certain period of time (e.g., 5 minutes).

Once a determination is made that the target tape is to be unloaded, the tape drive 60 rewinds, unmounts, and unloads the tape medium with low tension (e.g., lower than the normal tension used for reading and/or writing). This is illustrated at operation 440. After the tape drive is rewound with low tension, process 400 ends at operation 445.

The aforementioned operations can be completed in any order and are not limited to those described. Additionally, some, all, or none of the aforementioned operations can be completed, while still remaining within the spirit and scope of the present disclosure.

Figure 5:
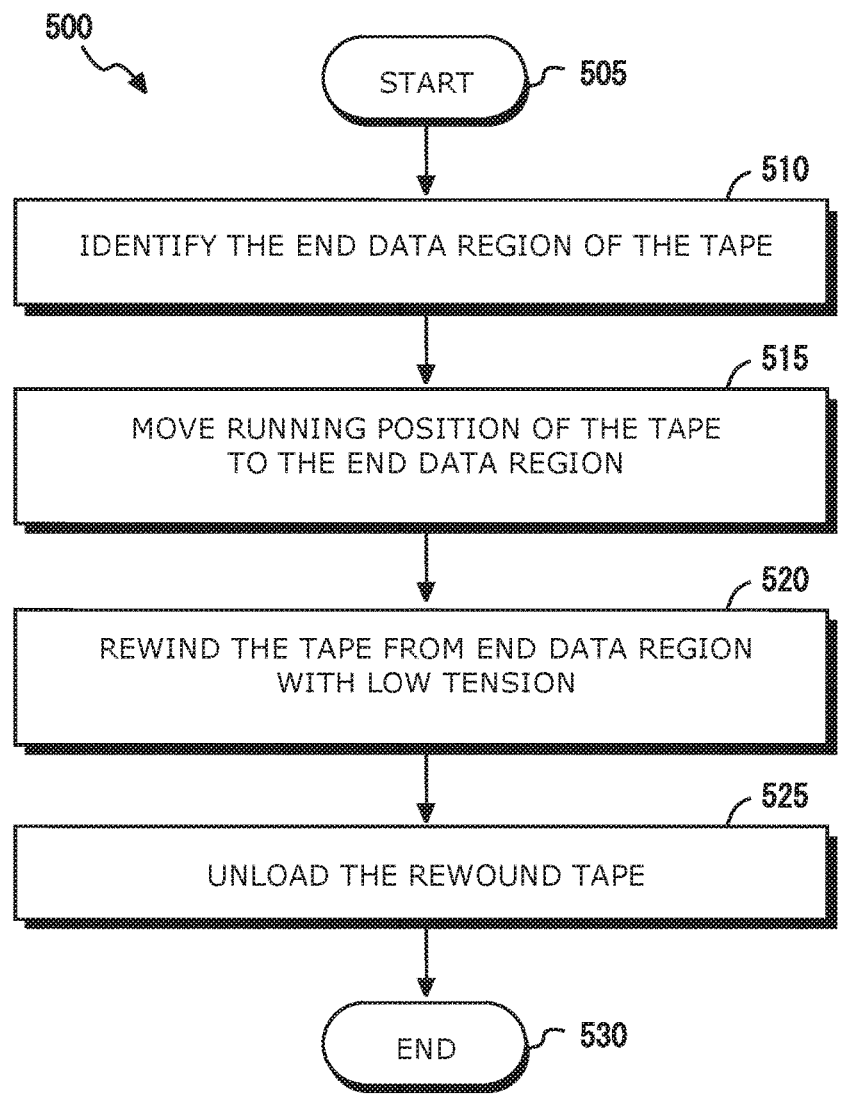
FIG. 5 illustrates a flow diagram for rewinding a tape medium, in accordance with embodiments of the present disclosure.

Referring now to FIG. 5, shown is a flow diagram of an example process 500 (e.g., a subprocess of operation 440 of FIG. 4) for unloading a tape, in accordance with embodiments of the present disclosure. The process initiates at operation 505, and then the tape drive 60 identifies the end data region of the tape at operation 510. In embodiments, the end data region on the tape can be the last region (e.g., partition of the tape) proximate to the EOT that stores data. In embodiments, this can be a partition defined by a safegap (e.g., see FIG. 6) or a scaled boundary (e.g., see FIG. 7). However, any other suitable region within the tape can be identified as the end data region. In some embodiments, the end data region is separated from the EOT by a minimum distance (e.g., the end data region at least 1 meter, 10 meters, 50 meters, etc. before the EOT).

The process 500 then proceeds to operation 515 when the tape drive 60 moves the running position of the tape from a current position to the end data region (e.g., identified at operation 510). In some embodiments, the tape may be moved a particular distance away (e.g., a margin) from the last end position.

Next, the tape drive rewinds the tape from the end data region of the tape with low tension. This is illustrated at operation 520. In embodiments, the tape can be read/written under a first tension, and then rewound (e.g., at operation 520) under a second tension, the second tension being less than the first tension. Once the rewinding operation is completed, the tape is unloaded from the tape drive 60. This is illustrated at operation 525. The process 500 then terminates at operation 530.

The aforementioned operations can be completed in any order and are not limited to those described. Additionally, some, all, or none of the aforementioned operations can be completed, while still remaining within the spirit and scope of the present disclosure.

Figure 6:
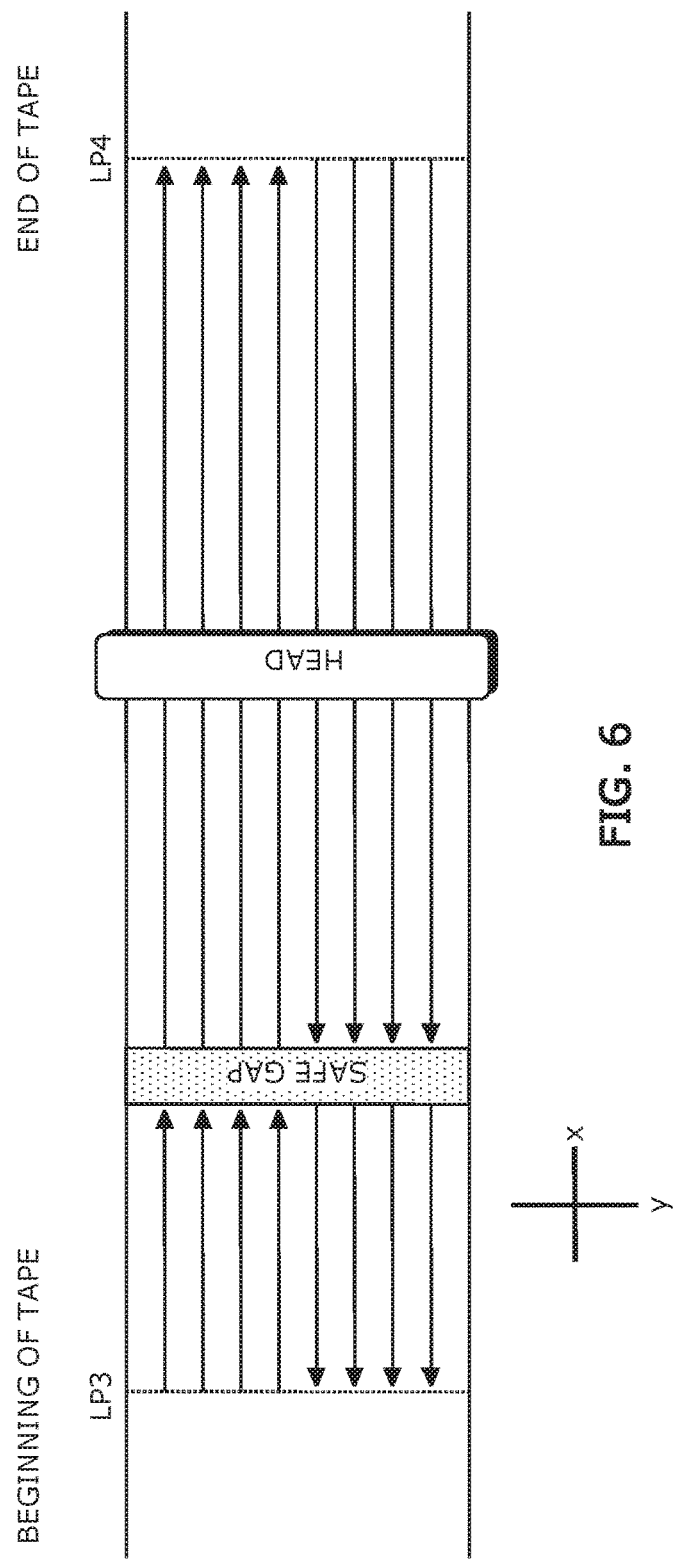
FIG. 6 illustrates a diagram of a tape medium including a safe gap partition, in accordance with embodiments of the present disclosure.

Referring now to FIG. 6, shown is a diagram illustrating a tape partitioned along a y-axis (e.g., the dividing lines align with the y-axis), in accordance with embodiments of the present disclosure. The tape drive 60 is capable of performing partitioning with which a tape is divided along the y-axis shown below FIG. 6. With this function, a region called "Safe gap" is interposed between regions divided along the y-axis. This enables the tape drive 60 to reduce the time of access to data written near the BOT. In embodiments, the partitions are handled as a plurality of volumes. IBM Tape Drive Products TS1150/TS1155 have both vertical (e.g., along the y-axis) and horizonal (along the x-axis) partitioning capabilities. As shown in FIG. 6, writing operations are initially performed in a first region between the BOT (LP3) and the safe gap, and then in a second region between the safe gap and the EOT (LP4) after the first half is full. If the first region is full and the second region is empty, then the safe gap is the end data region of the tape medium. This is because the safe gap is the end boundary of the nearest region to the EOT storing data.

Figure 7:
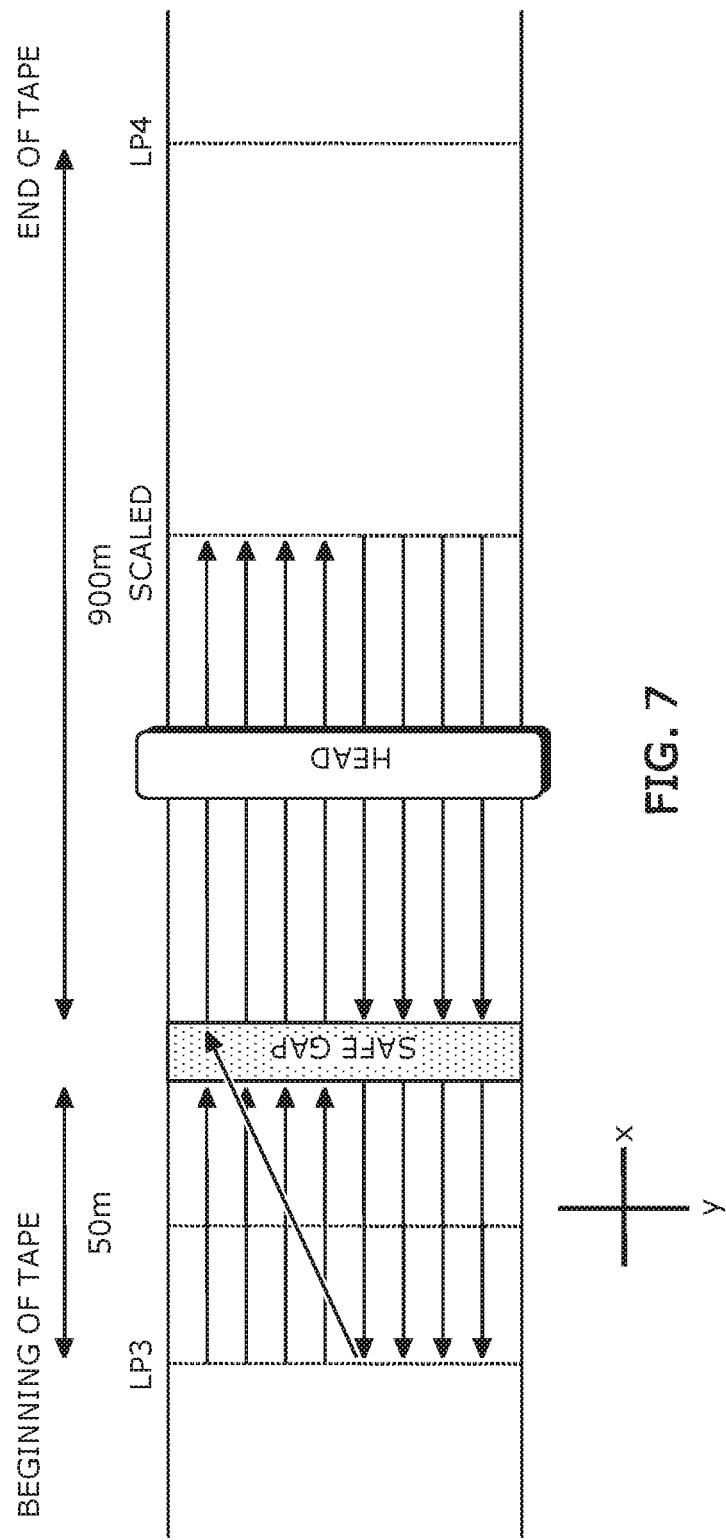
FIG. 7 illustrates a diagram of a tape medium having a set capacity, in accordance with embodiments of the present disclosure.

In embodiments, the tape drive 60 also supports a SCSI command called "Set Capacity". FIG. 7 illustrates a diagram where a tape volume is capped (e.g., restricted) using the "Set Capacity" command, in accordance with embodiments of the present disclosure. Once an administrator specifies a capacity for a tape by the "Set Capacity" command, the tape drive can use only a region between the BOT (LP3) and a specific position in the vertical (e.g., along the y-axis) direction called "Scaled" for writing data. As a result, the tape drive 60 can write a limited amount of data dictated by the "Set Capacity" command in a part of the tape between the BOT (LP3) and "Scaled" position. As shown in FIG. 7, writing operations are initially performed in the first half region between the BOT (LP3) and the safe gap, and then in the second half region between the safe gap and the scaled position after the first half region is full. In this example, if the first region (e.g., between the BOT and the safe gap) is full, and the second region (e.g., between the safe gap and scaled position) is full, then the scaled boundary is the end data region. This is because the scaled boundary is the end boundary of the nearest region to the EOT storing data. As shown in FIG. 7, the distance between BOT (LP3) and the safe gap can be approximately 50 meters whereas the distance between the safe gap and EOT (LP4) can be approximately 900 meters. These are example distances, and larger or shorter distances are possible in various embodiments.

Figure 8:
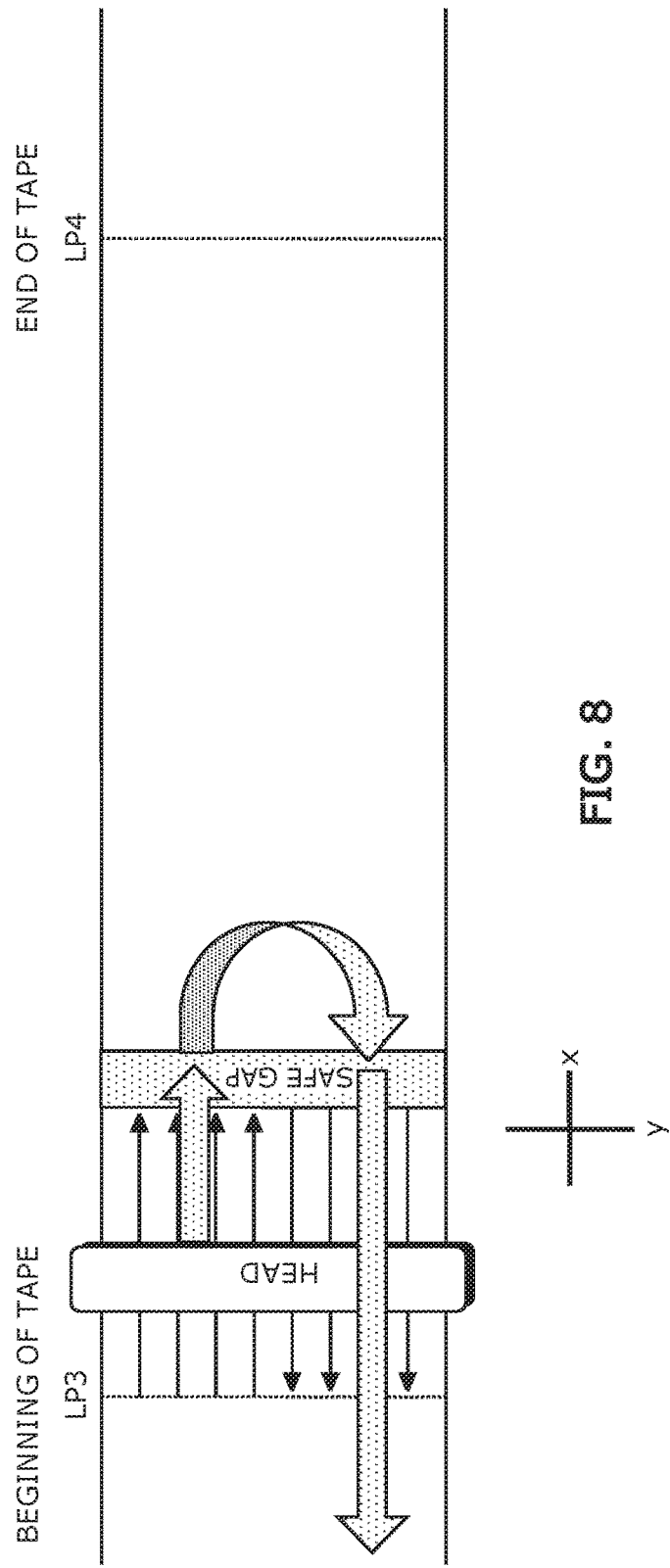
FIG. 8 illustrates a diagram of rewinding a tape medium from a safe gap end data region, in accordance with embodiments of the present disclosure.

Referring now to FIG. 8, shown is a diagram illustrating a tape being rewound from a safe gap vertical partition (e.g., along the y-axis), in accordance with embodiments of the present disclosure. Data is written to the tape between the BOT (LP3) and the safe gap. The end data region of the tape is thus the safe gap, given that there is no data written between the safe gap and the EOT (LP4). Accordingly, the safe gap is identified as the end data region (e.g., as in operation 510 of FIG. 5), such that the tape can be rewound from this point. In this example, it is unnecessary for the tape drive to move the running position to the EOT (LP4), as there is no data written between the safe gap and EOT (LP4). Accordingly, because the tape is rewound from the safe gap, less time is required for unloading the tape for long-term storage.

Figure 9:
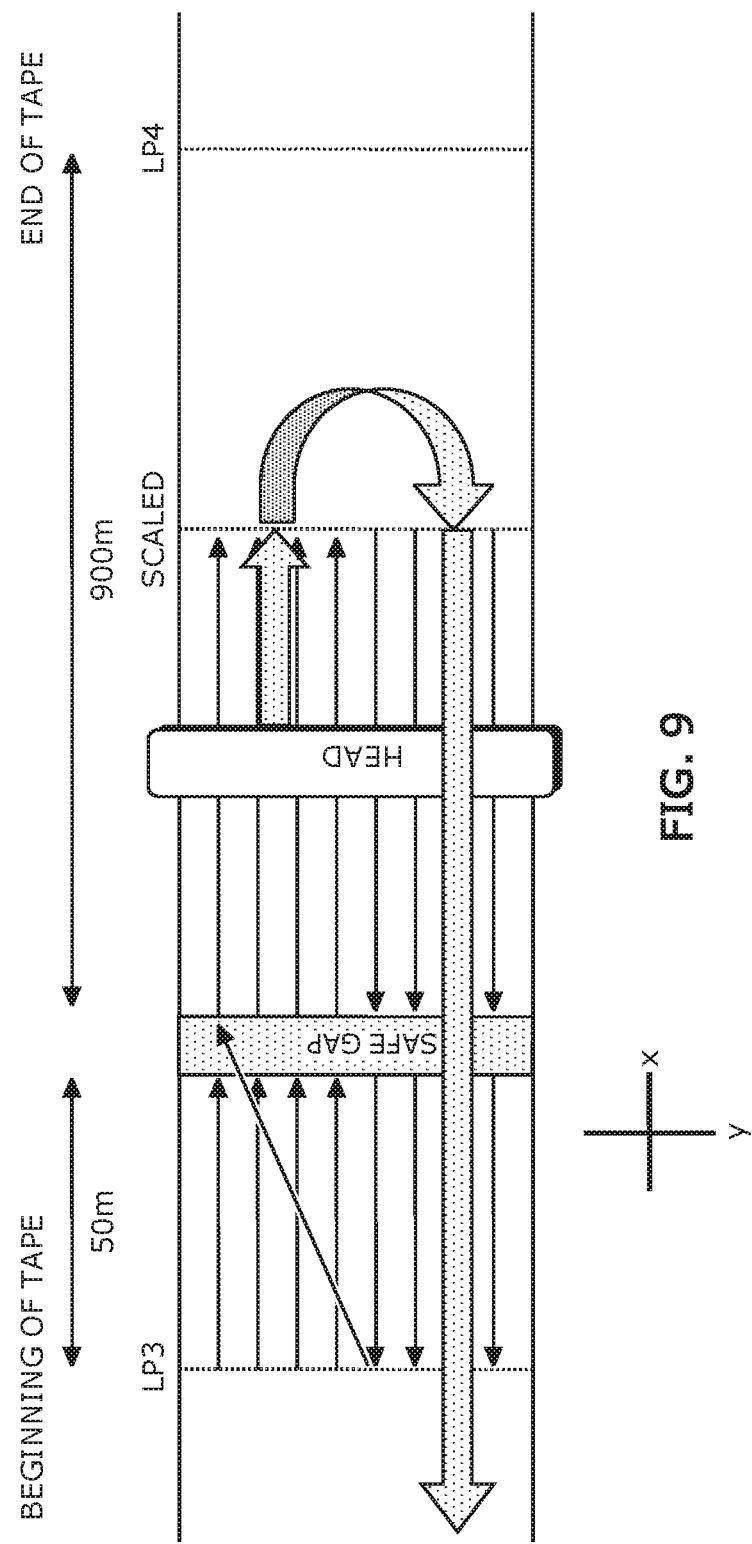
FIG. 9 illustrates a diagram of rewinding a tape medium from a set capacity end data region, in accordance with embodiments of the present disclosure.

FIG. 9 is a diagram illustrating a tape being rewound from a scaled position based on a set capacity, in accordance with embodiments of the present disclosure. The capacity of the tape can be set to the "scaled" position using the "Set Capacity" SCSI command. In this example, data is only written between the BOT (LP3) and the vertical partition designated by "scaled." Accordingly, the "scaled" position is identified as the end data region of the tape (e.g., at operation 510 of FIG. 5). When reading and/or writing are finished, the tape is then rewound from the end data region (the "scaled" position) of the tape with low tension. In this embodiment, a lower amount of time is required for rewinding the tape as the tape is not required to be rewound from the EOT (LP4). As shown in FIG. 9, the distance between BOT LP3 and the safe gap can be approximately 50 meters whereas the distance between the safe gap and EOT LP4 can be approximately 900 meters. These are example distances, and larger or shorter distances are possible in various embodiments. Although not explicitly shown, the distance between the safe gap and the scaled position can be less than 900 meters, and in some embodiments, substantially less than 900 meters such that significant time savings can be realized when rewinding from the scaled position compared to the EOT LP4 position.

Figure 10:
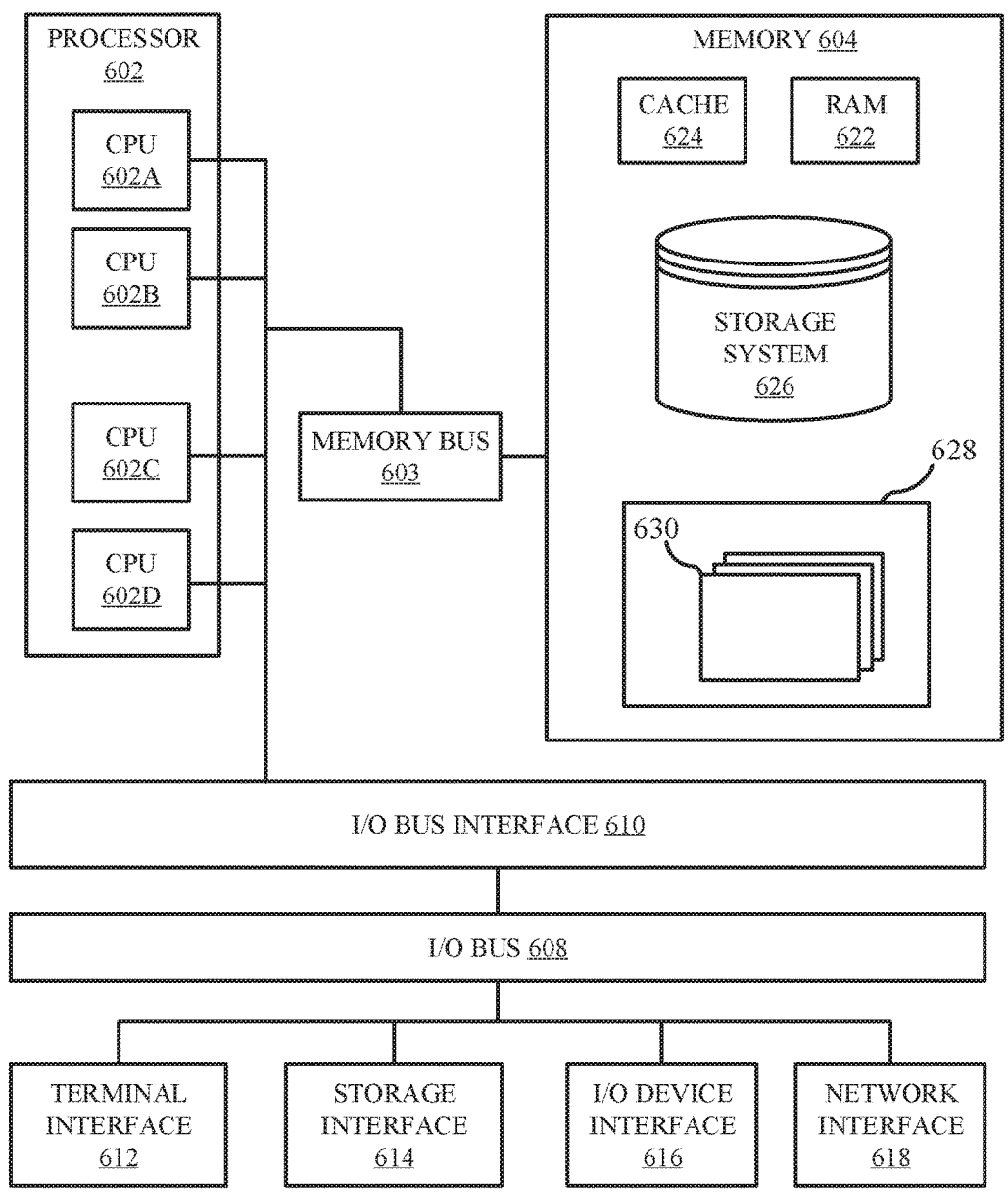
FIG. 10 is a high-level block diagram illustrating an example computer system that can be used in implementing one or more of the methods, tools, and modules, and any related functions, described herein, in accordance with embodiments of the present disclosure.

Referring now to FIG. 10, shown is a high-level block diagram of an example computer system 601 (e.g., host computer 300 of FIG. 3) that can be used in implementing one or more of the methods, tools, and modules, and any related functions, described herein (e.g., using one or more processor circuits or computer processors of the computer), in accordance with embodiments of the present disclosure. In some embodiments, the major components of the computer system 601 can comprise one or more CPUs 602, a memory subsystem 604, a terminal interface 612, a storage interface 614, an I/O (Input/Output) device interface 616, and a network interface 618, all of which can be communicatively coupled, directly or indirectly, for inter-component communication via a memory bus 603, an I/O bus 608, and an I/O bus interface unit 610.

The computer system 601 can contain one or more general-purpose programmable central processing units (CPUs) 602A, 602B, 602C, and 602D, herein generically referred to as the CPU 602. In some embodiments, the computer system 601 can contain multiple processors typical of a relatively large system; however, in other embodiments the computer system 601 can alternatively be a single CPU system. Each CPU 602 can execute instructions stored in the memory subsystem 604 and can include one or more levels of on-board cache.

System memory 604 can include computer system readable media in the form of volatile memory, such as random access memory (RAM) 622 or cache memory 624. Computer system 601 can further include other removable/non-removable, volatile/non-volatile computer system storage media. By way of example only, storage system 626 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 can include at least one program product having a set (e.g., at least one) of program modules that are configured to carry out the functions of various embodiments.

One or more programs/utilities 628, each having at least one set of program modules 630 can be stored in memory 604. The programs/utilities 628 can include a hypervisor (also referred to as a virtual machine monitor), one or more operating systems, one or more application programs, other program modules, and program data. Each of the operating systems, one or more application programs, other program modules, and program data or some combination thereof, can include an implementation of a networking environment. Programs 628 and/or program modules 630 generally perform the functions or methodologies of various embodiments.

In some embodiments, the program modules 630 of the computer system 601 can include a tape rewinding module. The tape rewinding module can be configured to identify an end data region of a tape medium, move the tape medium to the end data region, and rewind the tape medium from the end data region with low tension.

Although the memory bus 603 is shown in FIG. 6 as a single bus structure providing a direct communication path among the CPUs 602, the memory subsystem 604, and the I/O bus interface 610, the memory bus 603 can, in some embodiments, include multiple different buses or communication paths, which can be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 can, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices can be connected directly to one or more system I/O buses.

In some embodiments, the computer system 601 can be a multi-user mainframe computer system, a single-user system, or a server computer or similar device that has little or no direct user interface, but receives requests from other computer systems (clients). Further, in some embodiments, the computer system 601 can be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components can have greater or lesser complexity than as represented in FIG. 6, components other than or in addition to those shown in FIG. 6 can be present, and the number, type, and configuration of such components can vary.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for rewinding a tape medium of a linear file tape system (LFTS) comprising:
    defining, via a set capacity command, a capacity along the length of the tape medium;
    writing data to the tape medium under a first tension;
    identifying the capacity as an end data region of the tape medium, wherein the end data region is not the end of the tape medium;
    receiving an indication that the tape medium is to be unmounted;
    moving a position of the tape medium to the capacity; and
    rewinding the tape medium from the capacity under a second tension, the second tension being lower than the first tension.

2. The method of claim 1, further comprising:
    unloading the tape medium after the rewinding;
    receiving a write request from a host computer;
    determining a second tape medium identified by the write request;
    retrieving the second tape medium identified by the write request; and
    loading the second tape medium.

3. The method of claim 1, further comprising:
    receiving an indication regarding a second end data region that replaces the end data region;
    moving a position of the tape medium to the second end data region; and
    rewinding the tape medium from the second end data region under the second tension.

4. The method of claim 1, wherein the tape medium is rewound from the end data region to the beginning of the tape medium.

5. A system for rewinding a tape medium of a linear tape file system (LTFS), the system comprising:
    a memory storing program instructions; and
    a processor, wherein the processor is configured to execute the program instructions to perform a method comprising:
    writing data to the tape medium under a first tension;
    identifying a safe gap as an end data region of the tape medium, wherein the end data region is not the end of the tape medium;
    receiving an indication that the tape medium is to be unmounted;
    moving a position of the tape medium to the safe gap; and
    rewinding the tape medium from the safe gap under a second tension, the second tension being lower than the first tension.

6. The system of claim 5, wherein the method performed by the processor further comprises:
    unloading the tape medium after the rewinding;
    receiving a write request from a host computer;
    determining a second tape medium identified by the write request;
    retrieving the second tape medium identified by the write request; and
    loading the second tape medium.

7. The system of claim 5, wherein the method performed by the processor further comprises:
    receiving an indication regarding a second end data region that replaces the end data region;
    moving a position of the tape medium to the second end data region; and
    rewinding the tape medium from the second end data region under the second tension.

8. A computer program product comprising a computer readable storage medium having program instructions embodied therewith, the program instructions executable by a processor to cause the processor to perform a method for rewinding a tape medium of a linear tape file system (LTFS), the method comprising:
    defining, via a set capacity command, a capacity along the length of the tape medium;
    writing data to the tape medium under a first tension;
    identifying the capacity as an end data region of the tape medium, wherein the end data region is not the end of the tape medium;
    receiving an indication that the tape medium is to be unmounted;
    moving a position of the tape medium to the capacity; and rewinding the tape medium from the capacity under a second tension, the second tension being lower than the first tension.

9. The computer program product of claim 8, wherein the method further comprises:
unloading the tape medium after the rewinding;
receiving a write request from a host computer;
determining a second tape medium identified by the write request;
retrieving the second tape medium identified by the write request; and
loading the second tape medium.

10. The computer program product of claim 8, wherein the method further comprises:
receiving an indication regarding a second end data region that replaces the end data region;
moving a position of the tape medium to the second end data region; and
rewinding the tape medium from the second end data region under the second tension.

11. The computer program product of claim 8, wherein the tape medium is rewound from the end data region to the beginning of the tape medium.

* * * * *